US012774505B2

(12) United States Patent
Kim et al.

(10) Patent No.: US 12,774,505 B2
(45) Date of Patent: Oct. 27, 2026

(54) HOT PRESS FORMING MEMBER HAVING EXCELLENT RESISTANCE TO HYDROGEN EMBRITTLEMENT, AND METHOD FOR MANUFACTURING SAME

(71) Applicant: POSCO CO., LTD, Pohang-si (KR)

(72) Inventors: Seong-Woo Kim, Gwangyang-si (KR); Jin-Keun Oh, Gwangyang-si (KR); Sang-Heon Kim, Gwangyang-si (KR); Sang-Bin Han, Gwangyang-si (KR)

(73) Assignee: POSCO CO., LTD, Pohang-si (KR)

( * ) Notice: Subject to any disclaimer, the term of this patent is extended or adjusted under 35 U.S.C. 154(b) by 135 days.

(21) Appl. No.: 18/643,362

(22) Filed: Apr. 23, 2024

(65) Prior Publication Data

US 2024/0295003 A1 Sep. 5, 2024

Related U.S. Application Data

(62) Division of application No. 17/298,782, filed as application No. PCT/KR2019/016838 on Dec. 2, 2019, now Pat. No. 11,993,825.

(30) Foreign Application Priority Data

Dec. 3, 2018 (KR) ........................ 10-2018-0153533

(51) Int. Cl.
*C21D 9/48* (2006.01)
*B32B 15/01* (2006.01)
(Continued)

(52) U.S. Cl.
CPC .............. *C21D 9/48* (2013.01); *B32B 15/012* (2013.01); *C21D 6/002* (2013.01); *C21D 6/005* (2013.01);
(Continued)

(58) Field of Classification Search
CPC ....... B32B 15/013; B32B 15/012; C21D 6/49; C23C 2/26; C23C 2/28
See application file for complete search history.

(56) References Cited

U.S. PATENT DOCUMENTS 4,546,051 A 10/1985 Uchida et al.
6,296,805 B1 10/2001 Laurent et al.
(Continued)

FOREIGN PATENT DOCUMENTS

EP 3396010 A1 * 10/2018 ........... C23C 28/345
EP 3396010 B1 11/2019
(Continued)

OTHER PUBLICATIONS

International Search Report dated Aug. 20, 2020 issued in International Patent Application No. PCT/KR2019/016838 (with English translation).

(Continued)

*Primary Examiner* — Adam Krupicka
(74) *Attorney, Agent, or Firm* — Morgan Lewis & Bockius LLP

(57) ABSTRACT

The present invention pertains to a hot press forming member having excellent resistance to hydrogen embrittlement, and a method for manufacturing same. An aspect of the present invention provides a hot press forming member having excellent resistance to hydrogen embrittlement, the hot press forming member comprising a base steel plate and an alloy-plated layer formed on the surface of the base steel plate, wherein the alloy-plated layer contains pores such that pores having a size of 5 μm or less constitute 3-30% of the surface area of the alloy-plated layer as viewed in a cross-section taken in the thickness direction of the member.

19 Claims, 3 Drawing Sheets

(a) (b)

(51) Int. Cl.

| | |
|---|---|
| ***C21D 6/00*** | (2006.01) |
| ***C21D 8/04*** | (2006.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***C22C 38/28*** | (2006.01) |
| ***C22C 38/32*** | (2006.01) |
| ***C23C 2/02*** | (2006.01) |
| ***C23C 2/12*** | (2006.01) |
| ***C23C 2/28*** | (2006.01) |
| ***C23C 2/40*** | (2006.01) |

(52) U.S. Cl.

CPC ............... *C21D 6/008* (2013.01); *C21D 8/04* (2013.01); *C21D 8/0421* (2013.01); *C21D 8/0447* (2013.01); *C22C 38/001* (2013.01); *C22C 38/002* (2013.01); *C22C 38/02* (2013.01); *C22C 38/04* (2013.01); *C22C 38/06* (2013.01); *C22C 38/28* (2013.01); *C22C 38/32* (2013.01); *C23C 2/02* (2013.01); *C23C 2/12* (2013.01); *C23C 2/28* (2013.01); *C23C 2/29* (2022.08); *C23C 2/40* (2013.01)

(56) References Cited

U.S. PATENT DOCUMENTS

| | | | | |
|---|---|---|---|---|
| 10,344,360 | B2 | 7/2019 | Kusumi et al. | |
| 10,590,522 | B2 | 3/2020 | Oh et al. | |
| 2011/0006491 | A1 | 1/2011 | Spehner | |
| 2014/0234658 | A1 | 8/2014 | Nozaki et al. | |
| 2016/0024610 | A1 | 1/2016 | Tanahashi et al. | |
| 2016/0208355 | A1 | 7/2016 | Nakagaito et al. | |
| 2016/0318093 | A1 | 11/2016 | Maki et al. | |
| 2019/0003029 | A1 | 1/2019 | Oh et al. | |
| 2020/0101695 | A1* | 4/2020 | Oh .......................... | C22C 38/14 |
| 2022/0016870 | A1 | 1/2022 | Oh et al. | |
| 2024/0295003 | A1* | 9/2024 | Kim ......................... | C21D 1/76 |

FOREIGN PATENT DOCUMENTS

| | | | |
|---|---|---|---|
| JP | S57-173196 | A | 10/1982 |
| JP | S58-224159 | A | 12/1983 |
| JP | S62-199759 | A | 9/1987 |
| JP | H06-128713 | A | 5/1994 |
| JP | H11-286766 | A | 10/1999 |
| JP | 2002-194519 | A | 7/2002 |
| JP | 2004-176181 | A | 6/2004 |
| JP | 2004-244704 | A | 9/2004 |
| JP | 2005-264188 | A | 9/2005 |
| JP | 2009-293078 | A | 12/2009 |
| JP | 2019-506523 | A | 3/2019 |
| JP | 2020-509200 | A | 3/2020 |
| KR | 10-1536703 | B1 | 7/2015 |
| KR | 10-2015-0119072 | A | 10/2015 |
| KR | 10-2016-0095078 | A | 8/2016 |
| KR | 10-1696121 | B1 | 1/2017 |
| KR | 10-2018-0074292 | A | 7/2018 |
| WO | 2012/137687 | A1 | 10/2012 |
| WO | 2013/047836 | A1 | 4/2013 |

OTHER PUBLICATIONS

U.S. Notice of Allowance dated Feb. 7, 2024 issued in U.S. Appl. No. 17/298,782.

U.S. Non-Final Office Action dated Jul. 31, 2023 issued in U.S. Appl. No. 17/298,782.

Japanese Office Action dated Jun. 21, 2022 issued in Japanese Patent Application No. 2021-531411.

Indian Office Action dated Mar. 22, 2022 issued in Indian Patent Application No. 202117028930 (with English translation).

Extended European Search Report dated Nov. 11, 2021 issued in European Patent Application No. 19894077.7.

* cited by examiner

【FIGURE 1】
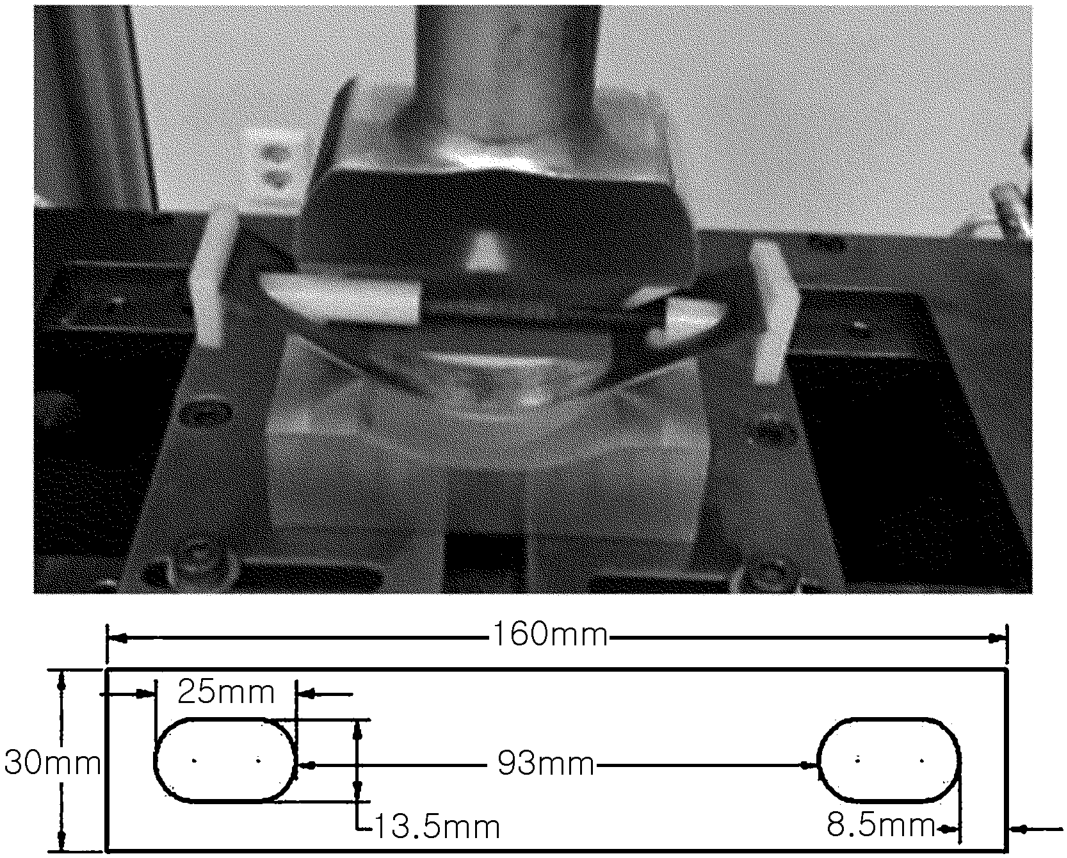

【FIGURE 2】
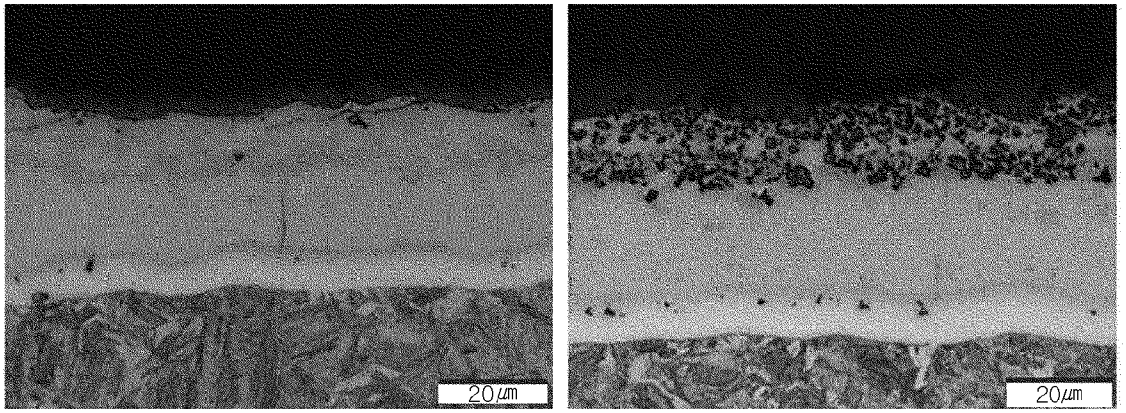
(a) (b)
【FIGURE 3】
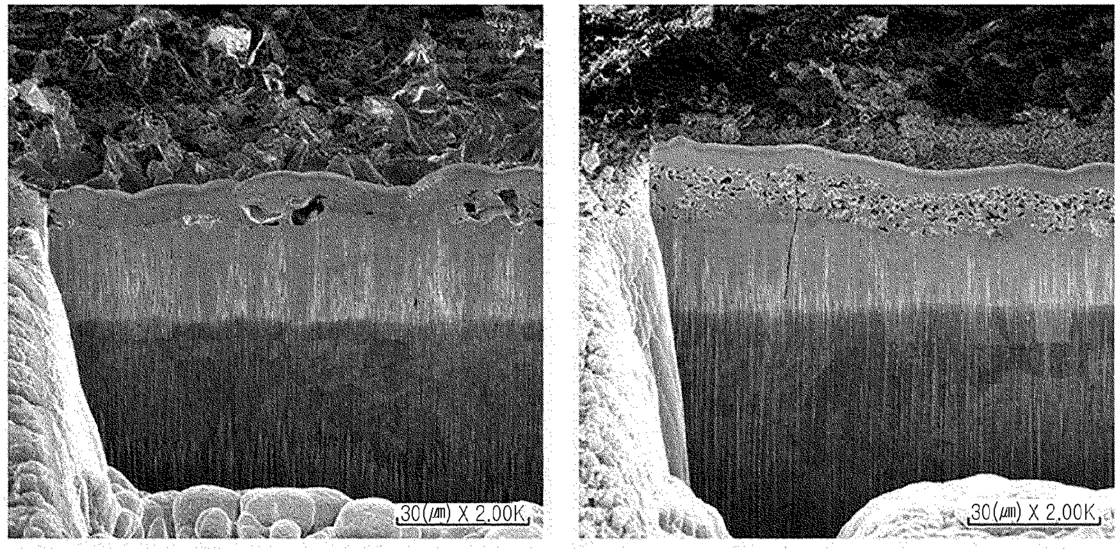
(a) (b)

【FIGURE 4】
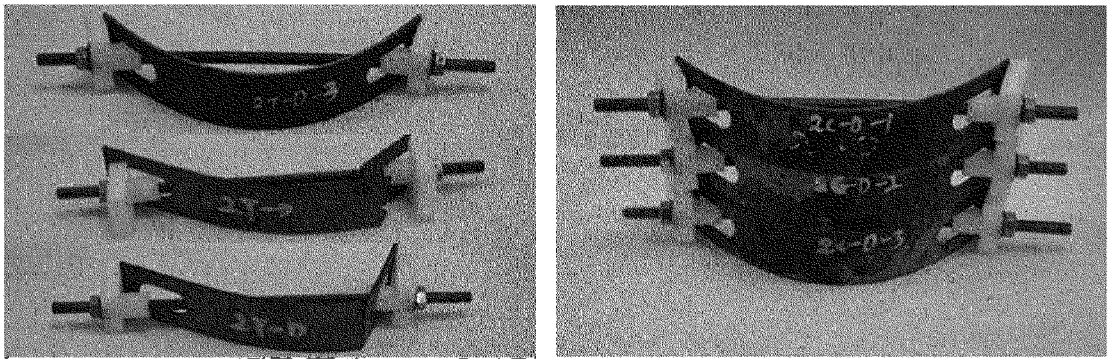
(a) (b)

HOT PRESS FORMING MEMBER HAVING EXCELLENT RESISTANCE TO HYDROGEN EMBRITTLEMENT, AND METHOD FOR MANUFACTURING SAME

CROSS-REFERENCE OF RELATED APPLICATIONS

This application is a Divisional patent application of U.S. patent application Ser. No. 17/298,782, filed on Jun. 1, 2021, which is the U.S. National Phase under 35 U.S.C. § 371 of International Patent Application No. PCT/KR2019/016838, filed on Dec. 2, 2019, which in turn claims the benefit of Korean Application No. 10-2018-0153533, filed on Dec. 3, 2018, the disclosures of which applications are incorporated by reference herein.

TECHNICAL FIELD

The present disclosure relates to a hot press formed member having excellent resistance to hydrogen embrittlement and a method of manufacturing the same.

BACKGROUND ART

In recent years, due to the depletion of petroleum energy resources and high interest in environmental protection, regulations on improving the fuel efficiency of automobiles are becoming stronger. In terms of materials, reducing a thickness of a steel sheet used in automobiles is one method for improving the fuel efficiency of automobiles. However, reducing the thickness of a steel sheet may cause problems in the safety of automobiles, such that the strength of the steel sheet should be supported.

Accordingly, there has been continuous demand for high-strength steel sheets, and various types of steel sheets have been developed. However, since such steel sheets have high strength in themselves, workability thereof is poor. That is, since a product of strength and elongation for each grade of steel sheet tends to always have a constant value, when the strength of the steel sheet increases, there may be an issue such as a decrease in elongation, an index of workability.

To address the above issue, a hot press forming method has been proposed. The hot press forming method is a method of forming a low temperature structure, such as martensite, in a steel sheet by forming at a high temperature suitable for forming and then quenching the steel sheet at a low temperature to increase the strength of an end product. In this case, a workability-related issue may be significantly reduced when manufacturing a member having high strength.

However, according to the above-described hot press forming method, a surface of the steel sheet may be oxidized because the steel is heated to a high temperature. Accordingly, after the press forming, a process of removing an oxide from the surface of the steel sheet should be added. As a method of addressing such an issue, Patent Document 1 has been proposed. According to Patent Document 1, a steel sheet subjected to aluminum plating is used in a process of hot press forming or heating and quenching after room-temperature forming (briefly, post-heat treatment). Since an aluminum plated layer is present on a surface of the steel sheet, the steel sheet is not oxidized during at the time of heating.

In the case of a high-strength member, so-called "hydrogen embrittlement" is often problematic. For example, when a member is brought into contact with a highly corrosive aqueous solution such as calcium chloride, hydrogen may permeate into a base steel sheet, and may be then accumulated therein, so that a high pressure is applied to the member to cause damage to the member, resulting in hydrogen embrittlement.

In general, a hot press forming method is a method of processing a material (blank) at a high temperature at which ductility of the material is increased. Therefore, a member manufactured by the hot press forming method has lower residual stress therein than a member manufacturing by a cold process forming method, and thus, may not be damaged even when hydrogen is accumulated in the member to generate pressure. As a result, the member manufactured by the hot pressing forming method may exhibit excellent resistance to hydrogen embrittlement. However, as recent demand for strength of automobile members has increased, sensitivity to hydrogen embrittlement of hot press formed members has also increased. In certain cases, additional cold working may be performed after hot press forming or stress may be applied in an automobile driving environment. Accordingly, there is an increasing need to improve resistance of a hot press formed member to hydrogen embrittlement.

PRIOR ART DOCUMENT

Patent Document (Patent Document 1) U.S. Pat. No. 6,296,805

DISCLOSURE

Technical Problem

An aspect of the present disclosure is to provide a hot press formed member having excellent resistance to hydrogen embrittlement and a method of manufacturing the same.

On the other hand, the feature of the present disclosure is not limited to the above description. It will be understood by those skilled in the art that there would be no difficulty in understanding additional features of the present disclosure.

Technical Solution

According to an aspect of the present disclosure, a hot press formed member having excellent resistance to hydrogen embrittlement includes a base steel sheet and an alloy-plated layer formed on a surface of the base steel sheet. The alloy-plated layer contains pores such that pores, having a size of 5 μm or less, account for 3 to 30% of a surface area of the alloy-plated layer, when viewed in a cross-section taken in a thickness direction of the hot press formed member.

According to another aspect of the present disclosure, a hot press formed member having excellent resistance to hydrogen embrittlement includes a base steel sheet and an alloy-plated layer formed on a surface of the base steel sheet. The alloy-plated layer contains pores such that number density, obtained by dividing an area of the alloy-plated layer by the number of pores having a size of 5 μm or less, is $5\times10^3$ to $2\times10^6$ number/mm$^2$, when viewed in a cross-section taken in a thickness direction of the hot press formed member.

According to another aspect of the present disclosure, a method of manufacturing a hot press formed member having excellent resistance to hydrogen embrittlement includes performing aluminum plating on a surface of a base steel sheet and coiling the base steel sheet to obtain an aluminum-plated steel sheet, annealing the aluminum-plated steel sheet to obtain an aluminum-iron alloy-iron alloy-plated steel sheet, and heat treating an aluminum-plated steel sheet for hot press forming in a temperature range of Ac3 to 950° C. for 1 to 15 minutes and then hot-press forming the heat treated aluminum-iron alloy-plated steel sheet for hot press forming. An amount of the aluminum plating is 30 to 200 $g/m^2$ per one side. A cooling rate to 250° C. after the aluminum plating is 20° C./sec or less. Coiling tension during the coiling is 0.5 to 5 $kg/mm^2$. The annealing is performed in a batch annealing furnace, containing hydrogen in a volume fraction of 50% or more, at a temperature range of 550 to 750° C. for 30 minutes to 50 hours. During the annealing, an average temperature increase rate is 10 to 100° C./h when the steel sheet is heated to the heating temperature from room temperature, and an average temperature increase rate in a section of 400 to 500° C. is 1 to 15° C./h. A difference between an atmospheric temperature in the batch annealing furnace and a temperature of the steel sheet is 5 to 80° C.

The technical solutions to the above-mentioned problems do not fully enumerate all features of the present disclosure. Various features of the present disclosure and the resulting advantages and effects will be understood in more detail with reference to the following detailed examples.

Advantageous Effects

As set forth above, shapes of pores in an alloy-plated layer may be appropriately controlled to effectively prevent hydrogen from permeating into a base steel sheet by a hot press formed member and a method of manufacturing the same. Thus, a hot press formed member having excellent resistance to hydrogen embrittlement may be provided.

The various and beneficial advantages and effects of the present disclosure are not limited to the above description, and can be more easily understood in the course of describing a specific embodiment of the present disclosure.

DESCRIPTION OF DRAWINGS

FIG. 1 illustrates an apparatus applying bending stress to a specimen according to an ISO7539-2 test method.

FIG. 2 is an image illustrating cross-sections of Comparative Example 1(a) and Inventive Example 1(b), observed using an optical microscope.

FIG. 3 is an image illustrating cross-sections, processed with focused ion beam (FIB), of Comparative Example 1 and Inventive Example 1, observed using a scanning electron microscope.

FIG. 4 is an image illustrating a result of observing whether fracture occurred in specimens when a stress corrosion cracking test was performed on Comparative Example 1 and Inventive Example 1.

BEST MODE FOR INVENTION

Hereinafter, an aluminum-iron alloy-plated steel sheet according to an aspect of the present disclosure will be described in detail. In the present disclosure, it should be noted that the content of each element means weight % unless otherwise specified. In addition, it should be noted that a ratio of crystals and structures is based on an area unless otherwise specified.

The hot press formed member may include an alloy layer formed by an alloying reaction between a base steel sheet and a plated layer in a heating process for forming or in a steel sheet preparing process before the heating process. In other words, the hot press formed member according to the present disclosure may include a base steel sheet and an alloy-plated layer formed on a surface of the base steel sheet.

According to research results of the present inventors, when an alloy layer formed on a surface of a base steel sheet is well controlled, hydrogen may be effectively prevented from permeating into the base steel sheet to obtain a hot press formed member having excellent resistance to hydrogen embrittlement.

Hydrogen is accumulated in a steel sheet to generate a press through the following operations, causing hydrogen embrittlement (however, it should be noted that the following description is only provided to briefly describe hydrogen embrittlement and is not intended to limit the scope of the present disclosure).

Moisture in a solution is decomposed into hydrogen and oxygen on a surface of a steel sheet (①), the hydrogen permeates into a base steel sheet in an atomic state (②), and hydrogen is accumulated in the base steel sheet to generate pressure (③).

The present disclosure provides a hot press formed member having excellent resistance to hydrogen embrittlement achieved by possibly blocking a process, in which hydrogen permeates into a base steel sheet, in the above-described hydrogen embrittlement mechanism.

That is, in an example embodiment of the present disclosure, a hot press formed member including a base steel sheet and an alloy-plated layer formed on a surface of the base steel sheet is provided, wherein the alloy-plated layer may have pores. According to the research results of the present inventors, when hydrogen is generated on a surface of a member, and then migrates to a base steel sheet, in the case in which pores are present in the migration process, a large amount of hydrogen is accumulated (trapped) in the pores of the alloy-plated layer. As a result, the amount of hydrogen reaching the base steel sheet may be significantly reduced.

In addition, a residual stress is not present to a significant level in the alloy-plated layer and the pressure may not cause damage to the entire member, unlike that acting on the base steel sheet even when pressure of hydrogen acts on the alloy-plated layer.

To obtain such an effect, the present disclosure is intended to form a large amount of micropores allowing hydrogen to be accumulated in an alloy-plated layer. In the present disclosure, the term "pore" refers to a pore having a size of 5 μm or less when analyzed using an image analyzer. When a single coarse pore is formed, the core may be destroyed while being used and may not serve as a pore, and may not be suitable for hydrogen collection due to a small specific surface area. Therefore, a target pore should have a size of 5 μm or less. The smaller a size of a pore is, the more advantageous it is. Therefore, a size of a pore is not limited but a typical pore may have a size of 0.1 μm or more in consideration of a common case. In addition, to obtain such an effect, at least one of the factors such as a fraction (an area ratio) and the number of micropores should be appropriately controlled, which will be described below in detail. According to an example embodiment, a size of a pore may be based on a circuit-equivalent diameter.

Fraction of Pores: 3 to 30% of Area of Entire Alloy-Plated Layer

When a member is observed in a cross-section taken in a thickness direction, a fraction of pores may have a ratio of 3% or more with respect to an area of the entire alloy-plated layer. The fraction of pores may be set to the above-described ratio to obtain a sufficient hydrogen accumulation effect. However, when the fraction of pores is too high, an alloy-plated layer may become vulnerable. In an example embodiment, the fraction of pores may be set to 30% or less. In another example embodiment, the fraction of pores may be set to 5 to 20%.

Number Density of Pores: $5\times10^3$ to $2\times10^6$ Number/mm$^2$

To provide an accumulation site of hydrogen, the number of the pores may be $5\times10^3$ number/mm$^2$ or more. However, when the number of the pores is excessive, an alloy-plated layer may become vulnerable. Therefore, in an example embodiment, the number of the pores may be limited to $2\times10^6$/mm$^2$ or less. In the present disclosure, the number density of pores refers to a value obtained by dividing the number of the pores by an area of the alloy-plated layer. In another example embodiment, the number density of the pores may be set to $9\times10^3$ to $1\times10^6$ number/mm$^2$.

The distribution or presence form of the micropores of the present disclosure is not limited as long as they are formed in an alloy layer and satisfy the above-mentioned conditions. However, when micropores are present at a position close to a base steel sheet, there is a probability that the hydrogen may return to the base steel sheet even when hydrogen is trapped by the pores. Therefore, in an example embodiment, more than 70% of all pores having a size of 5 μm or less may be present in a surface layer portion of the alloy-plated layer. Accordingly, the probability that the trapped hydrogen migrates to the base steel sheet may be further precluded. In terms of preventing the migration of trapped hydrogen, an upper limit of the area ratio of the pores present in the upper surface portion is not limited (including 100%) because the higher the area ratio is, the more advantageous it is. In another example embodiment, the area ratio of the pores present in the surface layer portion may be set to 80% or more.

In an example embodiment, the surface layer portion of the alloy-plated layer may refer to a portion above a centerline of a thickness, for example, a portion close to a free surface when viewed in a thickness direction of the alloy-plated layer. Even when a surface of the alloy-plated layer or an interface between the alloy-plated layer and the base steel sheet is not planar, the centerline may be obtained by connecting center points in a thickness direction at each point.

According to an example embodiment, the alloy-plated layer may refer to a plated layer formed by mainly diffusing iron (Fe) in the base steel sheet to an aluminum-plated layer, and may include, by weight percentage, 30 to 55% of Al, 35 to 60% of Fe, and further include the other plated layers or components originated from the base steel sheet.

As described above, the hot press formed member according to the present disclosure may include a base steel sheet and an alloy-plated layer formed on a surface of the base steel sheet, and may have excellent resistance to hydrogen embrittlement by controlling pores of the alloy-plated layer. The base steel sheet included in the hot press formed member according to the present disclosure is not particularly limited as long as it has a composition of the base steel sheet appropriate to the hot press formed member, but the base steel sheet according to an example embodiment may have a composition including, by weight, 0.04 to 0.5% of C, 0.01 to 2% of Si, 0.1 to 5% of Mn, 0.001 to 0.05% of P, 0.0001 to 0.02% of S, 0.001 to 1% of Al, 0.001 to 0.02% of N, and a balance of Fe and other impurities. Hereinafter, the reason for liming the content of each element will be described in detail.

Carbon (C): 0.04 to 0.5%

C may be added in an appropriate amount as an essential element for increasing the strength of a heat treatment member. For example, to secure sufficient strength of the heat treatment member, C may be added in an amount of 0.04% or more. In an example embodiment, a lower limit of the content of C may be 0.1% or more. However, when the content of C is too high in the case in which a cold-rolled material is manufactured, strength of a hot-rolled material may be too high when the hot-rolled material is cold rolled, so that cold rollability may be significantly deteriorated and spot weldability may also be significantly reduced. Therefore, C may be added in an amount of 0.5% or less to secure sufficient cold rollability and spot weldability. In addition, the content of C may be 0.45% or less, and may be limited to 0.4% or less.

Silicon (Si): 0.01 to 2%

Si not only needs to be added as a deoxidizer in a steelmaking process, but also suppresses formation of a carbide having a greatest effect on the strength of a hot press formed member. In the hot press forming, Si may be added in an amount of 0.01% or more such that retained austenite is secured by enriching carbon to a martensite lath boundary after formation of martensite. In addition, an upper limit of the content of Si may be set to 2% to secure sufficient platability when aluminum plating is performed on the steel sheet after rolling. In an example embodiment, the content of Si may be limited to 1.5% or less.

Manganese (Mn): 0.1 to 5%

The Mn may be added in an amount of 0.1% or more to secure a solid solution strengthening effect and to decrease a critical cooling rate for securing martensite in the hot press formed member. In addition, the content of Mn may be limited to 5% or less in terms of securing workability of the hot press forming process by appropriately maintaining the strength of the steel sheet, reducing manufacturing costs, and improving spot weldability.

Phosphorus (P): 0.001 to 0.05%

P is present as an impurity in steel, and the lower the content of P is, the more advantageous it is. Therefore, in an example embodiment, the content of P may be limited to 0.05% or less. In another example embodiment, the content of P may be limited to 0.03% or less. As described above, the lower the content of P is, the more advantageous it is, so that there is no need to set an upper limit of the content of P. However, since there is possibility that manufacturing costs may be increased to excessively reduce the content of P, a lower limit of the content of P may be set to be 0.001%.

Sulfur (S): 0.0001 to 0.02%

S is an impurity in steel. Since S is an element deteriorating ductility, impact characteristics, and weldability of a member, a maximum content of S is limited to 0.02% or the content of S may be preferably limited to 0.01% or less. In addition, since manufacturing costs may be increased when a minimum content of S is less than 0.0001%, a lower limit of the content of S may be 0.0001%.

Aluminum (Al): 0.001 to 1%

Al may serve as a deoxidizer, together with Si, in a steelmaking process to increase cleanliness of steel. To this end, Al may be added in an amount of 0.001% or more. In addition, the content of Al may be 1% or less to prevent a significant increase in Ac3 temperature such that heating required during hot press forming may be performed in an appropriate temperature range.

Nitrogen (N): 0.001~0.02%

N is an element included as an impurity in steel. To reduce sensitivity to occurrence of cracking during a continuous casting process of slab and to secure impact characteristics, N may be included in an amount of 0.02% or less. This is because the lower the content of N is, the more advantageous it is. Although a lower limit does not need to be determined, the content of N may be set to be 0.001% or more in consideration of an increase in manufacturing costs, or the like.

The aluminum-iron alloy-plated steel sheet according to an aspect of the present disclosure may further include at least one of 0.0001 to 0.01% of B, 0.01 to 1% of Cr, and 0.001 to 0.2% of Ti, in addition to the above-described alloy composition.

Boron (B): 0.0001 to 0.01%

The addition of even a small amount of B improves hardenability, and B segregates along prior-austenite grain boundaries to suppress embrittlement of a hot press formed member caused by grain boundary segregation of P and/or S. Therefore, B may be added in an amount of 0.0001% or more. However, when the content of B is greater than 0.01%, the effect may be saturated and embrittlement occurs in a hot rolling process, so that an upper limit of B may be 0.01%. In an example embodiment, the content of B may be 0.005% or less.

Chromium (Cr): 0.01 to 1%

Similarly to Mn, Cr is an element added to improve a solid solution strengthening effect and hardenability during hot press forming, and may be added in an amount of 0.01% or more to obtain the above effect. However, the content of Cr may be limited to 1% or less to secure weldability of the member. When the content of Cr is greater than 1%, the effect of improving hardenability is poor as compared with the amount of added Cr, which is disadvantageous in terms of cost.

Titanium (Ti): 0.001 to 0.2%

Ti is effective in improving the strength of the heat treatment member due to formation of fine precipitates and improving crashworthiness of the member due to grain refinement. Moreover, when B is added, Ti may first react with N to significantly improve a boron addition effect. To obtain such an effect, Ti may be added in an amount of 0.001% or more. However, the formation of coarse TiN, caused by an increase in the amount of Ti, may deteriorate the crashworthiness of the member, and thus, the content of Ti may be limited to 0.2% or less.

Iron (Fe) and inevitable impurities may be mentioned as a balance other than the above-described elements, and any element may be added as long as it can be included in the steel sheet for hot press forming.

A conventional aluminum-plated steel sheet for hot press forming has insufficient heat resistance because a melting point of an aluminum-plated layer is lower than a heating temperature for hot press forming. Therefore, a plating layer may melt during a heating process for hot press forming to contaminate a roll in a heating furnace, or to make rapid heating impossible. However, a steel sheet for hot press forming according to the present disclosure includes an aluminum-iron alloy-plated layer, and a melting point of the alloy-plated layer is about 1160° C. or more, higher than the heating temperature for hot forming. Therefore, the steel sheet for hot press forming according to the present disclosure may exhibit excellent heat resistance.

Hereinafter, a method of manufacturing a hot press formed member according to another aspect of the present disclosure will be described in detail. However, it does not mean that the steel sheet for hot press forming of the present disclosure should be manufactured by the present manufacturing method, and it is to be noted that any manufacturing method meets the claims of the present disclosure and there is no problem in implementing each embodiment of the present disclosure. To manufacture the hot press formed member, a process of manufacturing a steel sheet used in hot press forming and a hot press forming process should be performed. Therefore, two processes of the method of manufacturing a hot press formed member according to the present disclosure will be described below.

[Method of Manufacturing Aluminum-Iron Alloy-Plated Steel Sheet]

According to an example embodiment, unlike a conventional hot press forming process using an aluminum-plated steel sheet, an aluminum-iron alloy-plated steel sheet may be used in a hot press forming process to provide an advantageous hot press formed member of the present disclosure. As described above, an aluminum-iron alloy-plated steel sheet appropriate to a hot process formed member may be obtained by preparing a hot-rolled or cold-rolled base steel sheet, performing hot-dip aluminum plating on a surface of the base steel sheet, and performing annealing for alloying on the plated steel sheet. Hereinafter, each process will be described in detail.

Aluminum Plating Process

A process of preparing a base steel sheet having the above alloy composition, aluminum plating a surface of the base steel sheet under appropriate conditions and coiling is performed to obtain an aluminum-plated steel sheet (coil).

An aluminum plating treatment may be performed on a surface of the base steel sheet in a plating amount of 30 $g/m^2$ to 200 $g/m^2$ per one side. Aluminum plating may usually include AlSi plating (which may contain 80% or more of Al and 5% to 20% of Si and may include additional elements, as necessary), named as a type I, and any plating containing 90% or more of Al and additional elements, as necessary, named as a type II. Hot dip aluminum plating may be performed to form a plating layer, and an annealing treatment may be performed on the steel sheet before plating. An appropriate plating amount during plating is 30 $g/m^2$ to 200 $g/m^2$ per one side surface. When the plating amount is too large, it may take an excessive time to alloy to the surface. Meanwhile, when the plating amount is too small, it may be difficult to obtain sufficient corrosion resistance.

A cooling rate after the Al plating may be 20° C./sec or less until the temperature is 250° C. The cooling rate after aluminum plating may affect formation of a diffusion suppressing layer between a plating layer and base steel. When the cooling rate after aluminum plating is too high, the diffusion suppressing layer may not be uniformly formed, so that an alloying behavior of the coil may be not uniform during subsequent annealing. Accordingly, the cooling rate after the Al plating may be 20° C./sec or less until the temperature is 250° C.

When a coil is obtained by coiling the steel sheet after plating, coiling tension of the coil may be adjusted to 0.5 to 5 $kg/mm^2$. According to the adjustment of the coiling tension of the coil, alloying behavior and surface quality of the coil may be changed during a subsequent annealing treatment.

Annealing Process

An aluminum-iron alloy-plated steel sheet may be obtained by performing an annealing process on the aluminum-plated steel sheet under the following conditions.

The aluminum plated steel sheet (coil) may be heated in a batch annealing furnace (BAF). When a steel sheet is heated, a heat treatment target temperature and a holding time be maintained for 30 minutes to 50 hours in a range of 550° C. to 750° C., based on a temperature of the steel sheet (in the present disclosure, a highest temperature at which a material reaches in this temperature range is referred to as a heating temperature). The term "holding time" refers to a time after a coil temperature reaches a target temperature until the start of cooling. When alloying is not sufficiently performed, a plating layer may be peeled off during roll leveling, so that a heating temperature may be 550° C. or higher to achieve sufficient alloying. In addition, the heating temperature may be 750° ° C. or less to prevent excessive generation of oxides on a surface layer and to secure spot weldability. Moreover, the holding time may be set to be 30 minutes to 50 hours to sufficiently secure the plating layer and to prevent a decrease in productivity. In some embodiments, a temperature of the steel sheet may have a heating pattern in which the temperature continues to rise without a cooling process until a heating temperature is reached, and a heating pattern, in which the temperature rises after maintaining a certain time at a temperature lower than or equal to the target temperature, may be applied.

When the steel sheet is heated at the above-mentioned temperature, an average temperature increase rate may be set to 10 to 100° C./h in an entire temperature section (a section from room temperature to the heating temperature) to secure sufficient productivity and to uniformly alloy the plating layer in the entire steel sheet (coil). An overall average temperature increase rate may be controlled within the above numerical range but, in an example embodiment, the steel sheet may be heated at 1 to 15° C./h, an average temperature increase rate in a section of 400 to 500° C., to secure sufficient productivity while preventing rolling oil from remaining in the temperature range in which the rolling oil mixed during rolling is vaporized to cause surface stains.

A difference between an atmospheric temperature and a temperature of the steel sheet in the batch annealing furnace may be controlled to be 5° C. to 80° C. In general, heating of the batch annealing furnace employs a method of heating the steel sheet (coil) by increasing the atmospheric temperature in the annealing furnace, rather than a method of directly heating the steel sheet (coil). In this case, the difference between an atmospheric temperature and the coil temperature may not be avoided. However, the difference between the atmospheric temperature and the steel sheet temperature may be 80° C. or less, based on a point in time at which the heat treatment target temperature is reached, to minimize variations in materials and plating quality for each position in the steel sheet. It is ideal that the temperature difference should be as small as possible, but since this may reduce the temperature increase rate to make it difficult to satisfy the overall average temperature increase rate, the temperature difference may be 5° C. or more in consideration thereof. The temperature of the steel sheet may refer to a temperature measured in a bottom portion of the charged steel sheet (coil) (a lowest portion of the coil), and the atmospheric temperature may refer to a temperature measured in a center of an internal space of the heating furnace.

According to an example embodiment, the atmosphere during annealing may be adjusted to a hydrogen atmosphere to form a large number of pores in the hot press formed member. According to the research results of the present inventors, pores may be more easily formed by adjusting the atmosphere to a hydrogen atmosphere. In the present disclosure, the hydrogen atmosphere refers to an atmosphere in which a volume fraction of hydrogen is 50% or more (including 100%), and other gases other than hydrogen may not limited, but nitrogen or an inert gas may be used.

[Hot Press Forming Process]

A hot press forming process may be performed on an aluminum-iron alloy-plated steel sheet for hot press forming, manufactured by the above manufacturing method, to manufacture a hot press formed member. In this case, as the hot press forming process, a method employed generally in the art may be employed. As a non-limiting example embodiment, the hot press forming process may be performed after a heat treatment at a temperature range of Ac3 to 950° C. for 1 to 15 minutes

Mode for Invention

Hereinafter, the present disclosure will be described more specifically through embodiments. It should be noted, however, that the following embodiments are intended to illustrate the present disclosure in more detail and are not intended to limit the scope of the present disclosure. The scope of the present disclosure is determined by the matters set forth in the claims and the matters reasonably inferred therefrom.

EXAMPLES

A cold-rolled steel sheet for hot press forming having a composition in Table 1 (Ac3: 830° C.) was prepared. A surface of the steel sheet was plated using a type I plating bath having a composition of Al-8% Si-2.5% Fe. A plating amount during plating was adjusted to be 65 g/m$^2$ on each side. After the plating, cooling was performed at 8° C./sec until the temperature is decreased to 250° ° C. and then coiling tension was adjusted to be 2.4 kg/mm$^2$, so that that the steel sheet was coiled to obtain an aluminum-plated steel sheet.

TABLE 1

| Element | C | Si | Mn | Al | P | S | N | Cr | Ti | B |
|---|---|---|---|---|---|---|---|---|---|---|
| Content (%) | 0.2 | 0.25 | 1.23 | 0.04 | 0.012 | 0.0022 | 0.0055 | 0.22 | 0.03 | 0.003 |

Then, an alloying heat treatment in a batch annealing furnace and a hot press forming process were performed on the plated steel sheet under the conditions of Table 2 to obtain a hot press formed member (Inventive Example 1 to 3, Comparative Example 3). In Table 2, the atmosphere was adjusted in order for the rest of the atmosphere except $H_2$ to be nitrogen ($N_2$).

As an additional comparative example, a hot press formed member was obtained by performing a hot press forming process under the conditions of Table 2 without performing a separate alloying heat treatment on the above-described aluminum-plated steel sheet (Comparative Examples 1 and 2).

TABLE 2

| | Annealing Conditions for Alloying | | | | | | Conditions for Hot Press Forming | |
|---|---|---|---|---|---|---|---|---|
| | | 400-500 | | | | | | |
| | Tmp (° C.) | AHR (° C./h) | AHR (° C./h) | Tmp Diff (° C.) | $H_2$ Frt (%) | Time (h) | Tmp (° C.) | Time (min) |
| IE1 | 650 | 25 | 12 | 30 | 100 | 10 | 900 | 6 |
| IE2 | 600 | 22 | 14 | 35 | 100 | 18 | 930 | 5 |
| IE3 | 680 | 30 | 15 | 38 | 100 | 6 | 930 | 6 |
| IE4 | 590 | 18 | 8 | 25 | 55 | 28 | 930 | 7 |
| CE1 | — | — | — | — | — | — | 900 | 6 |
| CE2 | — | — | — | — | — | — | 930 | 5 |
| CE3 | 520 | 27 | 12 | 25 | 100 | 6 | 930 | 5 |

IE: Inventive Example
CE: Comparative Example
Tmp: Temperature
AHR: Average Heating Rate
400-500 AHR: Average Heating Rate of Temperature Range of 400° C. to 500° C.
Tmp Diff: Difference in Temperatures between Atmosphere and Steel Sheet at Heating Temperature
$H_2$ Frt: Fraction of $H_2$ in Atmosphere Cross-sections of the hot press formed members, obtained in Inventive Examples and Comparative Examples, were observed with a scanning electron microscope to measure a fraction of pores in the alloy-plated layer (a ratio of an area of pores to an overall area of the alloy-plated layer) and number density of the pores. The fraction and the number density are listed in Table 3. In addition, three specimens were taken from a planar part to evaluate whether occurrence of hydrogen embrittlement in the hot press formed members obtained in Invention Examples and Comparative Examples and, as illustrated in FIG. 1, stress corrosion cracking was evaluated under the condition in which U-bending was performed at a curvature of radius of 50R and then immersed in a 0.1N HCl solution and maintained for 300 hours according to the IOS 7539-2 test method, and thus, a weight reduction amount of the member and occurrence of cracking were checked with the naked eye and are listed in Table 3.

TABLE 3

| | Pore Frt (%) | Pore ND (number/mm$^2$) | Pore Ratio (%) | Stress Corrosion Cracking Evaluation: Weight Loss (g) | Stress Corrosion Cracking Evaluation: Cracking |
|---|---|---|---|---|---|
| IE1 | 9.4 | $1.9 \times 10^4$ | 87.0 | 1.87 | Not Occurred |
| IE2 | 8.2 | $1.6 \times 10^4$ | 90.1 | 2.23 | Not Occurred |
| IE3 | 17.6 | $3.6 \times 10^4$ | 91.2 | 2.53 | Not Occurred |
| IE4 | 3.9 | $9.6 \times 10^3$ | 88.7 | 1.96 | Not Occurred |
| CE1 | 0.5 | $0.9 \times 10^3$ | 56.3 | 1.85 | Occurred |
| CE2 | 1.4 | $1.1 \times 10^3$ | 37.7 | 2.12 | Occurred |
| CE3 | 2.3 | $1.4 \times 10^3$ | 42.3 | 2.22 | Occurred |

IE: Inventive Example
CE: Comparative Example
Pore Frt: Fraction of Pores in Plated Layer
Pore ND: Number Density of Pores in Plated Layer
Pore Ratio: Ratio of Pores Present in Surface Layer Portion FIGS. 2 and 3 illustrate images of observing cross-sections of hot press formed members of Comparative Example 1(a) and Inventive Example 1(b) of the present disclosure. The cross-sections are typical cross-sections appearing in Comparative Examples and Inventive Examples. As can be seen in FIG. 2, in the case of Comparative Example 1, there were not many pores in an alloy-plated layer, whereas in the case of Inventive Example 1, there were a large number of pores in an alloy-plated layer. Such a difference in the degree of formation of pores results in a difference in the degree of stress corrosion cracking (the degree of hydrogen embrittlement), as illustrated in Table 3. It can be seen that there was a slight difference in degree between Inventive Examples and Comparative Examples, but there was a large difference in hydrogen embrittlement therebetween although there was no particular difference in the degree of corrosion causing generation of hydrogen as the weight reduction amounts were similar to each other.

That is, as can be seen in Table 3, in the case of Inventive Examples 1 to 3 in which a fraction of pores in a plating layer or the number density of pores in the plating layer satisfied the scope of the present disclosure, cracking caused by stress corrosion cracking, a measure of hydrogen embrittlement, did not occur at all, whereas in the case of Comparative Examples 1 to 3 in which sufficient pores were not formed, cracking occurred.

FIG. 4 illustrates results of stress corrosion cracking of Comparative Example 1 and Inventive Example 1. In the case of Comparative Example 1, two of the three specimens were fractured after a stress corrosion cracking test, but in the case of Inventive Example 1, specimens were not fractured at all.

In addition, in the case of Inventive Example, it was also confirmed that a possibility of transferring trapped hydrogen to a base steel sheet was significantly reduced by the presence of a large number of pores in a surface layer.

Accordingly, the advantageous effects of the present disclosure can be confirmed.

The invention claimed is:

1. A hot press formed member, comprising:

a base steel sheet; and an alloy-plated layer on the base steel sheet, wherein, when viewed from a cross-section cut in the thickness direction of the hot press formed member, a ratio of an area occupied by pores with a size of 5 μm or less to an area occupied by the alloy-plated layer is between 3 to 30%.

2. The hot press formed member of claim 1, wherein, when viewed from a cross-section cut in the thickness direction of the hot press formed member, the ratio of the area occupied by pores with the size of 5 μm or less to the area occupied by the alloy-plated layer is 5% or more.

3. The hot press formed member of claim 2, wherein, when viewed from a cross-section cut in the thickness direction of the hot press formed member, the ratio of the area occupied by pores with the size of 5 μm or less to the area occupied by the alloy-plated layer is 20% or less.

4. The hot press formed member of claim 1, wherein, based on a total area of pores having a size of 5 μm or less in the alloy plating layer, 70% or more of said total area is located in the surface layer portion, and wherein the surface layer portion means a portion above a centerline of a thickness of the alloy-plated layer.

5. The hot press formed member of claim 1, wherein, based on a total area of pores having a size of 5 μm or less in the alloy plating layer, 80% or more of said total area is located in the surface layer portion, and wherein the surface layer portion means a portion above a centerline of a thickness of the alloy-plated layer.

6. The hot press formed member of claim 1, wherein a content of Al in the alloy-plated layer is 30 to 55%.

7. The hot press formed member of claim 1, wherein a content of Fe in the alloy-plated layer is 35 to 60%.

8. The hot press formed member of claim 1, wherein the base steel sheet comprises, by weight, 0.04 to 0.5% of carbon (C), 0.01 to 2% of silicon (Si), 0.1 to 5% of manganese (Mn), 0.001 to 0.05% of phosphorus (P), 0.0001 to 0.02% of sulfur(S), 0.001 to 1% of aluminum (AI), 0.001 to 0.02% of nitrogen (N), and a balance of iron (Fe) and other impurities.

9. The hot press formed member of claim 6, wherein the base steel sheet further comprises, by weight, at least one of 0.0001 to 0.01% of boron (B), 0.01 to 1% of chromium (Cr), and 0.001 to 0.2% of titanium (Ti).

10. A hot press formed member, comprising:

a base steel sheet; and an alloy-plated layer on the base steel sheet, wherein, when viewed from a cross-section cut in the thickness direction of the hot press formed member, a ratio of an area occupied by pores with a size of 5 μm or less to an area occupied by the alloy-plated layer is 3% or more.

11. The hot press formed member of claim 10, wherein, based on a total area of pores having a size of 5 μm or less in the alloy plating layer, 70% or more of said total area is located in the surface layer portion, and wherein the surface layer portion means a portion above a centerline of a thickness of the alloy-plated layer.

12. The hot press formed member of claim 10, wherein, based on a total area of pores having a size of 5 μm or less in the alloy plating layer, 80% or more of said total area is located in the surface layer portion, and wherein the surface layer portion means a portion above a centerline of a thickness of the alloy-plated layer.

13. The hot press formed member of claim 10, wherein a content of Al in the alloy-plated layer is 30 to 55%.

14. The hot press formed member of claim 10, wherein a content of Fe in the alloy-plated layer is 35 to 60%.

15. A hot press formed member, comprising:

a base steel sheet; and an alloy-plated layer on the base steel sheet, wherein, when viewed from a cross-section cut in the thickness direction of the hot press formed member, a ratio of an area occupied by pores with a size of 5 μm or less to an area occupied by the alloy-plated layer is 30% or less.

16. The hot press formed member of claim 15, wherein, based on a total area of pores having a size of 5 μm or less in the alloy plating layer, 70% or more of said total area is located in the surface layer portion, and wherein the surface layer portion means a portion above a centerline of a thickness of the alloy-plated layer.

17. The hot press formed member of claim 15, wherein, based on a total area of pores having a size of 5 μm or less in the alloy plating layer, 80% or more of said total area is located in the surface layer portion, and wherein the surface layer portion means a portion above a centerline of a thickness of the alloy-plated layer.

18. The hot press formed member of claim 15, wherein a content of Al in the alloy-plated layer is 30 to 55%.

19. The hot press formed member of claim 15, wherein a content of Fe in the alloy-plated layer is 35 to 60%.

* * * * *